Patented July 26, 1927.

1,636,942

UNITED STATES PATENT OFFICE.

GEORGE W. PRATHER, OF DES MOINES, IOWA.

PROCESS FOR PREPARING WATER-SOFTENING MATERIALS.

No Drawing.   Application filed August 10, 1916.   Serial No. 114,271.

This invention relates to a process for treating a natural zeolite-like substance to render it capable of softening water.

In carrying out the invention a mineral which has for its base a hydrated silicate of aluminum containing a small amount of impurities and some moisture is reduced to about the size of an English walnut, placed in a ten percent salt solution at a temperature of about 200° F., kept there for about two hours and is then placed on driers and allowed to dry in the open air for about thirty days, or until practically all the uncombined moisture is driven off. The material is then dried by artificial heat until the remainder of the moisture is driven off. The material is subsequently reduced to particles of suitable size by mechanical means and an alkali metal compound is added and mixed therewith. The mixture is then baked in an oven or furnace at a high temperature until the mineral is hard enough to resist the powdering action of water. During the baking, the alkali metal compound melts and thoroughly permeates the particles of mineral. Finally, the mineral is washed free of excess alkali compound and is then dumped into a vat of salt water and stored there. Suitable alkali metal compounds for incorporating in the mineral are the hydroxides of potassium and sodium, and the carbonates of potassium and sodium or a mixture of two or more of such compounds.

I find that the desired results may likewise be secured by taking the natural zeolite-like substance, having for its base the hydrated silicate of aluminum containing a small amount of impurities and some moisture and drying the same at a low temperature either in the air by the heat of the sun or by artificial heat until all of the uncombined water is removed, after which the material is baked at a high temperature in an oven or furnace until the mineral is hard enough to resist the powdering action of water. The mineral is then dumped into a vat of salt water and stored there.

Either of the above described treatments of the material renders it granular and porous and of such a nature that it is highly efficient as a water softener. The material while stored in the salt water gives off such calcium and magnesia as is contained therein. It is then capable of absorbing from any water passed through it, all calcium and magnesia contained in the water and leaving a pure, soft water.

After the material has absorbed all the calcium and magnesium salts that it is capable of absorbing, said salts may be removed from the mineral by treating the same with a solution of salt water thereby restoring the mineral to its full capacity for softening water. Since the calcium and magnesia taken up by the mineral may be thus removed and since the treatment given the mineral renders it non-reducible under the action of water it follows that the life of the mineral is very great.

My invention further contemplates the boiling of the mineral in the initial salt solution and it contemplates the storing of the material in a dry condition instead of in salt water, where desired.

Having described my invention what I claim is:—

1. The process for forming a filtering and water softening material which consists of drying a mineral having for its base a hydrated silicate of aluminum until practically all the uncombined moisture is driven off, reducing such mineral to particles of suitable size by mechanical means, then baking such mineral at a high temperature in the presence of sodium hydroxide (NaOH) until the hydroxide melts and thoroughly permeates the mineral and the particles are rendered hard and finally washing the mineral free of excess sodium hydroxide.

2. The process for forming a filtering and water softening material which consists of drying a mineral having for its base a hydrated silicate of aluminum until practically all the uncombined moisture is driven off, reducing such mineral to particles of suitable size by mechanical means, then baking such mineral at a high temperature in the presence of sodium hydroxide and potassium hydroxide until said hydroxides melt and thoroughly permeate the mineral and finally washing the mineral free of excess potassium and sodium hydroxide.

3. The process for forming a filtering and water softening material which consists in reducing the mineral to particles of suitable size by mechanical means, then adding an alkali metal hydroxide to the mineral particles and baking the mixture at a temperature sufficiently high to render the particles hard enough to resist the powdering action of water and finally washing the particles free of excess hydroxide.

4. The process for forming a filtering and water softening material which consists in reducing the mineral to particles of suitable size by mechanical means, then adding sodium hydroxide to the mineral particles and baking the mixture at a temperature sufficiently high to liquefy the hydroxide and render the particles hard enough to resist the powdering action of water and finally washing the particles free of excess hydroxide.

In testimony whereof I have affixed my signature.

GEORGE W. PRATHER.